United States Patent
Zhang et al.

(10) Patent No.: US 10,362,376 B2
(45) Date of Patent: Jul. 23, 2019

(54) SPEAKER AND REAR COVER THEREFOR

(71) Applicant: Goertek Inc., Weifang (CN)

(72) Inventors: Qingyi Zhang, Weifang (CN); Gang Chen, Weifang (CN); Shuangshuang Fan, Weifang (CN)

(73) Assignee: GOERTEK, INC., Weifang (CN)

( * ) Notice: Subject to any disclaimer, the term of this patent is extended or adjusted under 35 U.S.C. 154(b) by 0 days.

(21) Appl. No.: 15/781,081

(22) PCT Filed: May 9, 2016

(86) PCT No.: PCT/CN2016/081404
§ 371 (c)(1),
(2) Date: Jun. 1, 2018

(87) PCT Pub. No.: WO2017/092231
PCT Pub. Date: Jun. 8, 2017

(65) Prior Publication Data
US 2018/0359545 A1 Dec. 13, 2018

(30) Foreign Application Priority Data

Dec. 2, 2015 (CN) .......................... 2015 1 0874212

(51) Int. Cl.
*H04R 1/00* (2006.01)
*H04R 1/02* (2006.01)
(Continued)

(52) U.S. Cl.
CPC ............... *H04R 1/02* (2013.01); *H04M 1/02* (2013.01); *H04R 1/22* (2013.01); *H04R 31/006* (2013.01);
(Continued)

(58) Field of Classification Search
CPC .............................. H04R 1/06; H04R 2499/11
See application file for complete search history.

(56) References Cited

U.S. PATENT DOCUMENTS

| 8,995,704 B2 * | 3/2015 | Huang | .................... H04R 9/043 |
| | | | 181/171 |
| 2011/0051987 A1 * | 3/2011 | Ueda | ....................... B06B 1/045 |
| | | | 381/412 |

(Continued)

FOREIGN PATENT DOCUMENTS

| CN | 103269462 A | 8/2013 |
| CN | 203618051 U | 5/2014 |

(Continued)

OTHER PUBLICATIONS

State Intellectual Property Office of the People's Republic of China, First Office Action for Application No. CN 201510874212.7, dated Dec. 15, 2017.

(Continued)

*Primary Examiner* — Matthew A Eason
(74) *Attorney, Agent, or Firm* — Rimon PC

(57) ABSTRACT

The present invention discloses a speaker and a rear cover therefor. The rear cover comprises a rear cover body whose one side is provided with a first connection portion; and a connection assembly provided with a first surface and a second surface which are connected with each other. A contact is formed by extending and bending the first surface, and is provided with a conductor. A connection hole is further formed in the first surface. A limiting device and a second connection portion are arranged on the second surface; and the cross section of the limiting device is C-shaped. The connection assembly is connected to the first connection portion of the rear cover body through the second connection portion. The contact is configured to conduct the speaker with the outside. The connection hole is configured to fix the speaker or conduct the speaker with other components.

18 Claims, 3 Drawing Sheets

(51) Int. Cl.
*H04M 1/02* (2006.01)
*H04R 1/22* (2006.01)
*H04R 31/00* (2006.01)

(52) U.S. Cl.
CPC .... *H04R 2201/029* (2013.01); *H04R 2499/11* (2013.01)

(56) References Cited

U.S. PATENT DOCUMENTS

| | | | |
|---|---|---|---|
| 2011/0293121 A1* | 12/2011 | Yan | H04R 7/04 381/191 |
| 2012/0321117 A1 | 12/2012 | Chen | |
| 2018/0234772 A1* | 8/2018 | Meng | H04R 9/06 |

FOREIGN PATENT DOCUMENTS

| | | |
|---|---|---|
| CN | 203691625 U | 7/2014 |
| CN | 104243644 A | 12/2014 |
| CN | 204681568 U | 9/2015 |
| CN | 204681584 U | 9/2015 |
| CN | 105392072 A | 3/2016 |
| CN | 205179292 U | 4/2016 |
| JP | 2008-141317 A | 6/2008 |

OTHER PUBLICATIONS

State Intellectual Property Office of the People's Republic of China, First Search Report for Application No. CN 201510874212.7, dated Dec. 15, 2017.
State Intellectual Property Office of the People's Republic of China, Second Office Action for Application No. CN 201510874212.7, dated Jul. 17, 2018.
The International Bureau of WIPO, International Preliminary Report on Patentability and Written Opinion for Int'l Application No. PCT/CN2016/081404, dated Jun. 5, 2018.
State Intellectual Property Office of the People's Republic of China, International Search Report for International Application No. PCT/CN2016/081404, dated Aug. 19, 2016.

* cited by examiner

SPEAKER AND REAR COVER THEREFOR

CROSS-REFERENCE TO RELATED APPLICATIONS

This application is a National Stage of International Application No. PCT/CN2016/081404, filed on May 9, 2016, which claims priority to Chinese Patent Application No. 201510874212.7, filed on Dec. 2, 2015, both of which are hereby incorporated by reference in their entireties.

FIELD OF THE INVENTION

The present invention relates to the technical field of acoustic energy conversion, and in particular, to a speaker and a rear cover therefor.

BACKGROUND OF THE INVENTION

Structural design requirements of a speaker (SPK), as a component of a mobile phone, are becoming stricter. At a local position of a module, multiple structures often need to cooperate to realize a variety of functions. Exemplarily, for a stamped part in the SPK, sometimes, it is required to lead out a plurality of structures from the local, such as an electric contact conduction structure, a cable fixing structure and a screw fixation structure. However, a single steel sheet cannot realize these complex structures due to the limitations of a stamping raw material, a stamping process, plating and other factors.

SUMMARY OF THE INVENTION

An object of the present invention is to provide a new technical solution of a speaker rear cover with multiple functions.

According to a first aspect of the present invention, there is provided a speaker rear cover. The rear cover comprises a rear cover body whose one side is provided with a first connection portion; and a connection assembly provided with a first surface and a second surface which are connected with each other.

A contact is formed by extending and bending the first surface, and is provided with a conductor; and a connection hole is further formed in the first surface.

A limiting device and a second connection portion are arranged on the second surface. The cross section of the limiting device is C-shaped. The connection assembly is connected to the first connection portion of the rear cover body through the second connection portion.

Preferably, the first surface is perpendicular to the second surface.

Preferably, the conductor is arranged on the contact through electroplating or electroless plating.

Preferably, the conductor is made of gold, tin or nickel.

Preferably, the connection manner between the first connection portion and the second connection portion is welding, riveting or elastic contact connection.

Preferably, the connection manner is the elastic contact connection.

A U-shaped structure is formed by bending and extending the two opposite sides of the second connection portion.

A first external wall and a second external wall opposite to each other are arranged on the first connection portion. A distance between the first external wall and the second external wall is greater than a distance between two sides of the U-shaped structure.

The two sides of the U-shaped structure clamp the outer sides of the first external wall and the second external wall to form a set clamping force, so as to enable stable connection.

Preferably, the connection assembly is made of a metal.

Preferably, the thickness of the rear cover body is 0.15-0.2 mm.

Preferably, the rear cover body and/or the connection assembly are/is formed by stamping.

Another object of the present invention is to provide a speaker.

According to another aspect of the present invention, there is provided a speaker. The speaker comprises the rear cover provided by the present invention.

The speaker rear cover provided by the present invention is provided with the rear cover body and the connection assembly connected with the rear cover body. The rear cover body and the connection assembly are separately manufactured and then are connected. The connection assembly comprises the contact provided with the conductor, the connection hole and the limiting structure. The contact is configured to conduct the speaker with the outside. The connection hole is configured to fix the speaker or conduct the speaker with other components. The limiting device is configured to fix a cable. With the separate design, the rear cover is simpler in structure, more convenient to manufacture and higher in production yield, and integrates multiple functions. The speaker has the characteristics of being higher in integration, more convenient to mount and wider in application.

The inventor of the present invention finds that in the prior art, a speaker rear cover is single in structure and low in applicability. Therefore, the technical task to be achieved or the technical problem to be solved by the present invention is unintentional or unanticipated for those skilled in the art, and thus the present invention refers to a novel technical solution.

Further features of the present invention and advantages thereof will become apparent from the following detailed description of exemplary embodiments according to the present invention with reference to the accompanying drawings.

BRIEF DESCRIPTION OF THE DRAWINGS

The accompanying drawings, which are incorporated in and constitute a part of the description, illustrate embodiments of the present invention and, together with the description thereof, serve to explain the principles of the present invention.

Figure 1:
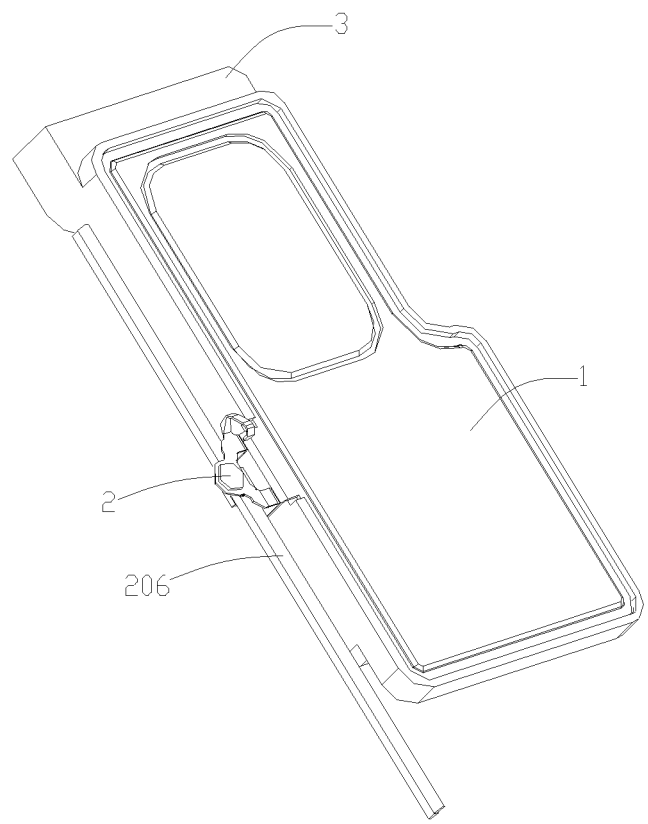
FIG. 1 is a structural view of a rear cover according to an embodiment of the present invention.

1: rear cover body; 101: first connection portion; 2: connection assembly; 201: contact; 202: connection hole; 203: second connection portion; 204: limiting device; 205: screw; 206: cable; 3: middle cover; 4: upper cover; and 5: magnetic circuit assembly.

DETAILED DESCRIPTION OF THE EMBODIMENTS

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the present invention, its application, or uses.

Techniques and equipment as known by one of ordinary skill in the relevant art may not be discussed in detail but are intended to be part of the description where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed in the accompanying drawings.

Figure 2:
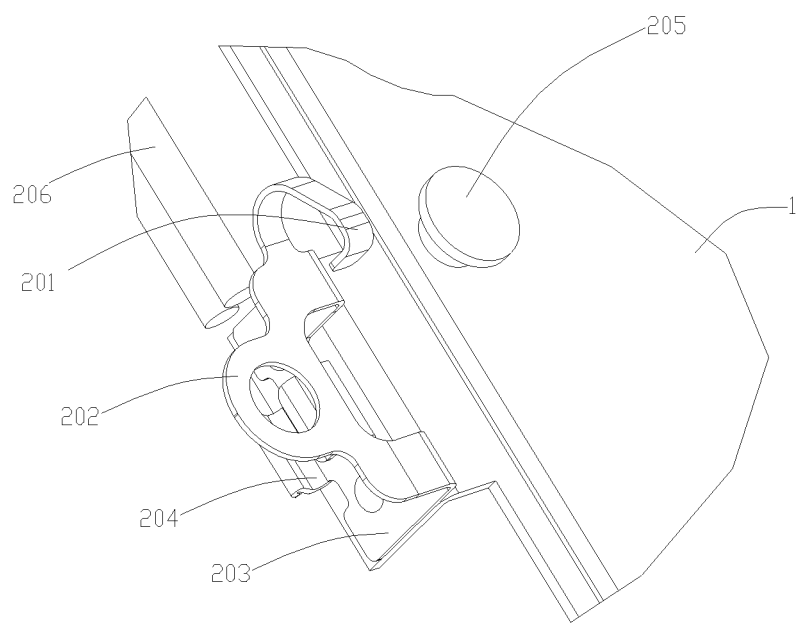
FIG. 2 is a partial enlarged view of the rear cover according to the embodiment of the present invention.
Figure 3:
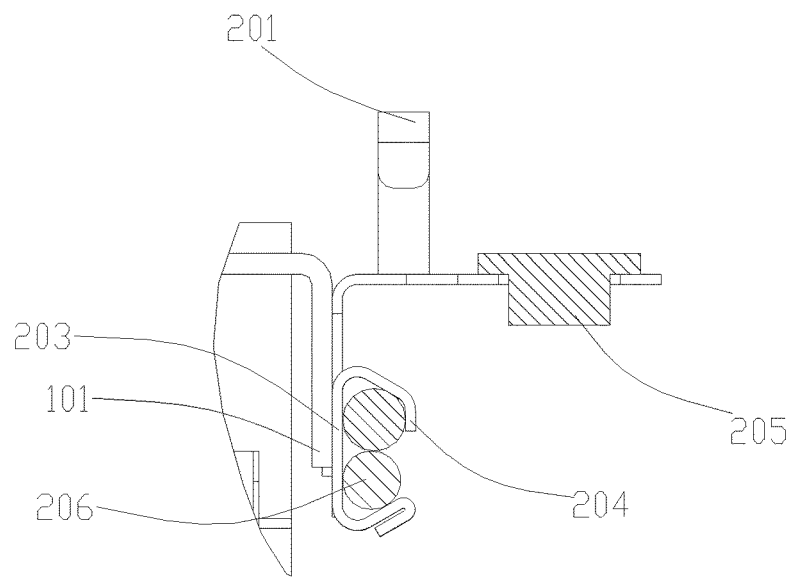
FIG. 3 is a sectional view of a connection assembly according to an embodiment of the present invention.

The present invention provides a speaker rear cover. Referring to FIGS. 1-3, the rear cover comprises a rear cover body 1 and a connection assembly 2. A first connection portion 101 is arranged on one side of the rear cover body 1, and is generally formed by extending one side of the rear cover body 1 outwards. In order to facilitate processing and save space, in an embodiment of the present invention, referring to FIG. 3, one side of the rear cover body 1 extends outwards and is bent downwards into a right angle to form the first connection portion 101. In this way, the first connection portion 101 is located on the side surface of the speaker, and the connection assembly 2 is arranged on the side, so that space in the height direction is saved, and light and thin requirements on equipment to be mounted are met. Of course, the bending angle may be selected as required, and is not limited to a right angle. The first connection portion 101 may also be separately manufactured and then is connected to the rear cover body 1, which is not limited in the present invention.

In general, the rear cover body 1 is manufactured separately. The rear cover body 1 is sheet-shaped, and is made of a metal. In a preferred embodiment, the rear cover is made of stainless steel. Considering that the stainless steel may also rust after long-term use, more preferably, the surface of the rear cover is plated with a nickel metal layer to prolong the service life of the rear cover. The thickness of the rear cover is 0.15-0.2 mm. Of course, the shape and the material of the rear cover may be selected according to needs as long as the strength and durability requirements can be met, and are not limited in the present invention.

Figure 5:
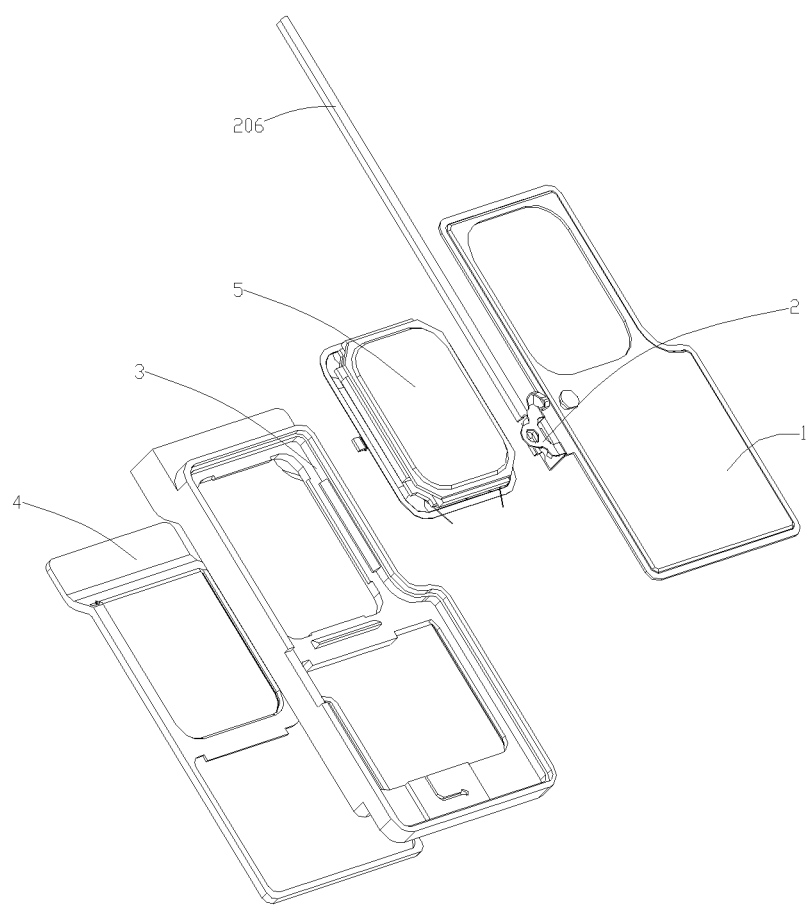
FIG. 5 is an exploded view of the speaker according to the embodiment of the present invention.

In use, referring to FIG. 5, the rear cover is mounted at one side of the middle cover 3. The flatness and the processing size of the rear cover should have set machining accuracy, so as to ensure good sealing after the rear cover is mounted on the middle cover 3. In order to ensure the machining accuracy of both the flatness and the processing size, in an embodiment of the present invention, the rear cover body 1 is formed by integrally stamping a stainless steel sheet. A connection manner between the rear cover and the middle cover 3 may be clamping connection. That is, a clamping groove is formed in the inner side of the side wall of the middle cover 3; and during mounting, the edge of the rear cover is embedded in the clamping groove. Of course, the connection manner may also be others according to needs, such as bonding.

Referring to FIG. 2, the connection assembly 2 is provided with a first surface and a second surface which are connected with each other. The connection assembly 2 is made of a metal. In a preferred embodiment, the connection assembly 2 is made of stainless steel, copper alloy or aluminum alloy. Of course, the connection assembly 2 may also be made of other materials such as plastic, plastic cement or silicone according to needs. In order to facilitate processing and save space, in a preferred embodiment of the present invention, the first surface is perpendicular to the second surface; and the connection assembly 2 is processed through stamping forming. Of course, a set angle may be formed between the first surface and the second surface according to requirements, which is not limited in the present invention. The second surface is provided with a second connection portion; and the connection assembly 2 is connected to the first connection portion 101 of the rear cover body 1 through the second connection portion 203. The connection manner between the first connection portion 101 and the second connection portion 203 may be welding, riveting or elastic contact connection.

Figure 4:
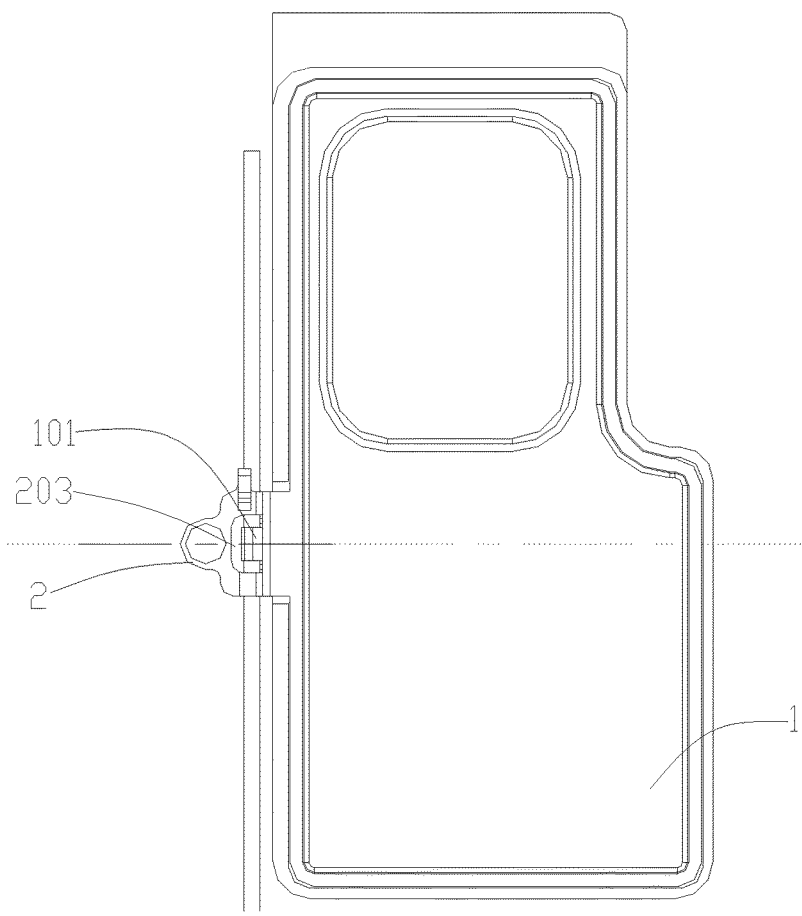
FIG. 4 is a front view of a speaker according to an embodiment of the present invention.

In order to make the connection more stable, referring to FIG. 4, in an embodiment of the invention, the connection manner is the elastic contact connection. A U-shaped structure is formed by bending and extending the two opposite sides of the second connection portion 203. The opening of the U-shaped structure may be horizontal or vertical, or may be at other angles. A first external wall and a second external wall opposite to each other are arranged on the first connection portion 101. A distance between the first external wall and the second external wall is greater than that between the two sides of the U-shaped structure. For facilitating processing, the first connection portion 101 is rectangular, and the two opposite sides of the rectangle are the first external wall and the second external wall. The two sides of the U-shaped structure clamp the outer sides of the first external wall and the second external wall to form a set clamping force, so as to enable stable connection. Of course, the first connection portion 101 may also be cylindrical or may be in other shapes as long as it is provided with the first and second external walls opposite to each other; and the distance between the first and second external walls is greater than that between the two sides of the U-shaped structure to enable the two sides of the U-shaped structure to clamp the outer sides of the first and second external walls, which is not limited in the present invention.

Alternatively, in another embodiment of the present invention, the connection manner is the elastic contact connection. A U-shaped structure is formed by bending and extending the two opposite sides of the second connection portion 101. Similarly, the opening of the U-shaped structure may be horizontal or vertical, or may be at other angles. A first external wall and a second external wall opposite to each other are arranged on the second connection portion 203. A distance between the first external wall and the second external wall is greater than that between the two sides of the U-shaped structure. For facilitating processing, the second connection portion 203 is rectangular, and the two opposite sides of the rectangle are the first external wall and the second external wall. The two sides of the U-shaped structure clamp the outer sides of the first external wall and the second external wall to form a set clamping force, so as to enable stable connection. Of course, the second connection portion 203 may also be cylindrical or may be in other shapes as long as it is provided with the first and second external walls opposite to each other; and the distance between the first and second external walls is greater than that between the two sides of the U-shaped structure to enable the two sides of the U-shaped structure to clamp the outer sides of the first and second external walls, which is not limited in the present invention.

Further, the second surface is further provided with a limiting device 204. The device is configured to fix the position of multiple strands of cables 206, so that the cables 206 are prevented from moving arbitrarily during the use of equipment to be mounted. As a result, the equipment is prevented from damage caused by a scratched insulating jacket and other loose components. For facilitating processing and use, referring to FIG. 3, in the present invention, the cross section of the limiting device 204 is C-shaped. In use, the multiple strands of cables 206 are sequentially placed from the opening of the C-shaped limiting device 204. The device can effectively fix the position of the multiple strands of cables 206. In order to prevent the insulating jacket of the cable 206 from being scratched at the opening when the cable 206 is mounted, the edge at the opening is bent by 180 degrees, so that the place where the opening is in contact with the cable 206 is smooth, avoiding scratch.

Further, referring to FIG. 2, the connection assembly is further provided with a contact. The contact 201 is formed by extending and bending the first surface; and the bending direction may be designed according to needs. The contact 201 is configured to electrically connect the speaker with other components. In order to ensure the reliability of the electrical connection, the contact 201 is provided with a conductor. During connection, a wire of the coil is connected with a wire from the outside at the contact 201, and the wire to be connected can be welded to the contact 201 by soldering. The electrical connection can be effectively realized by virtue of the conductor on the contact 201. Of course, the connection manner is not limited to welding, or may be others, such as contact-type electrical connection, as long as the effectiveness and the stability of the electrical connection can be ensured, which is not limited in the present invention.

In order to ensure a large contact area and a firm connection between the conductor and the contact 201, in an embodiment of the present invention, the conductor is arranged on the contact 201 by electroplating or electroless plating. The separate arrangement manner can also avoid contamination of the rear cover body 1 during electroplating or electroless plating. The conductor is made of gold, tin or nickel. Of course, the conductor may also be arranged on the contact 201 through other manners as long as the connection manner can ensure sufficient connection stability, which is limited in the present invention. In addition, the conductor may also be made of other metals as long as good electrical conductivity is ensured.

Referring to FIGS. 2 and 3, in order to facilitate the connection between the speaker and the equipment to be mounted, such as a mobile phone, a tablet computer and a smart watch, a connection hole 202 is further formed in the first surface. In a preferred embodiment of the present invention, an internal thread is arranged in the connection hole 202; and a screw 205 matched with the internal thread is further arranged on the connection hole 202. During mounting, the connection hole 202 is aligned with a mounting hole of the equipment to be mounted, wherein the connection hole 202 is located below the mounting hole. Then, the screw 205 passes through the mounting hole to be tightly screwed to the connection hole 202. Thus, the mounting is very convenient. Of course, the connection hole 202 may not be provided with the internal thread. The speaker may be mounted in a mounting hole at a set position through the connection hole 202 by using a bolt connection manner, which is not limited in the present invention.

In addition, the connection hole 202 may also have the electrical connection function. In another embodiment of the present invention, the connection assembly 2 is made of copper alloy or aluminum alloy which has excellent electrical conductivity. Through the connection with the outside wire, electrical conduction between an internal circuit of the speaker and an outside circuit can be achieved. During connection, a wire of the internal circuit of the speaker, such as a wire of a voice coil, is connected to the connection assembly 2; and then, a cable lug plate (namely, a cable lug) of a wire of the outside circuit, or a mounting hole at a feeding point is electrically connected with the connection hole 202 through the screw 205 or a bolt. In this way, the electrical conduction between the internal circuit of the speaker and the outside circuit can be achieved. The connection is very convenient.

For facilitating processing and manufacturing, the rear cover body 1 and/or the connection assembly 2 are/is processed by an integral stamping process. For example, the rear cover body 1 or the connection assembly 2 is formed by integrally stamping a sheet. During processing, the structures of the first connection portion 101 and the second connection portion 203 should be matched with each other to facilitate connection. After being separately formed, the first connection portion 101 of the rear cover body 1 and the second connection portion 203 of the connection assembly 2 are connected to form the rear cover provided by the present invention. In addition, the stamping forming process can produce a connection assembly with a complex structure as required. The processing is very convenient. In addition, as the separate manufacturing manner is adopted, the processing steps are reduced, and the processing difficulty is reduced. Therefore, the yield is improved.

The speaker rear cover provided by the present invention is provided with the rear cover body 1 and the connection assembly 2 connected with the rear cover body 1. The assembly comprises the contact 201 provided with the conductor, the connection hole 202 and the limiting structure. The contact 201 is configured to conduct the speaker with the outside. The connection hole 202 is configured to fix the speaker or conduct the speaker with other components. The limiting device 204 is configured to fix the cable. With the separate design, the rear cover is simpler in structure, more convenient to manufacture and higher in production yield, and integrates multiple functions.

The present invention further provides a speaker. Referring to FIG. 5, the speaker comprises an upper cover 4, a middle cover 3, the rear cover and a magnetic circuit system. The rear cover is mounted at one side of the middle cover 3; and the upper cover 4 is mounted at the other side of the middle cover 3 and is opposite to the rear cover. The upper cover 4, the middle cover 3 and the rear cover are connected to form an internal accommodation chamber. A magnetic circuit assembly 5 is mounted in the accommodation chamber. The speaker rear cover is provided with a connection assembly 2; and an internal circuit of the speaker is electrically connected with an external circuit through a contact 201. A cable 206 of to-be-mounted equipment with the speaker is limited through a limiting device 204 of the connection assembly 2. The speaker is mounted onto the equipment to be mounted through a connection hole 202.

The speaker has the characteristics of being higher in integration, more convenient to mount and wider in application.

Although some specific embodiments of the present invention have been demonstrated in detail with examples, it should be understood by a person skilled in the art that the above examples are only intended to be illustrative but not to limit the scope of the present invention. It should be understood by those skilled in the art that the above embodiments can be modified without departing from the scope and spirit of the present invention. The scope of the present invention is defined by the appended claims.

What is claimed is:

1. A speaker rear cover, comprising:
   a rear cover body whose one side is provided with a first connection portion, and
   a connection assembly provided with a first surface and a second surface which are connected with each other, wherein
   a contact is formed by extending and bending the first surface, and is provided with a conductor; a connection hole is further formed in the first surface;
   a limiting device and a second connection portion are arranged on the second surface; the cross section of the limiting device is C-shaped; and the connection assembly is connected to the first connection portion of the rear cover body through the second connection portion.

2. The speaker rear cover of claim 1, wherein the first surface is perpendicular to the second surface.

3. The speaker rear cover of claim 1, wherein the conductor is arranged on the contact through electroplating or electroless plating.

4. The speaker rear cover of claim 1, wherein the conductor is made of gold, tin or nickel.

5. The speaker rear cover of claim 1, wherein the connection mode between the first connection portion and the second connection portion is welding, riveting or elastic contact connection.

6. The speaker rear cover of claim 5, wherein the connection manner is the elastic contact connection;
   a U-shaped structure is formed by bending and extending the two opposite sides of the second connection portion;
   a first external wall and a second external wall opposite to each other are arranged on the first connection portion;
   a distance between the first external wall and the second external wall is greater than a distance between two sides of the U-shaped structure; and
   the two sides of the U-shaped structure clamp the outer sides of the first external wall and the second external wall to form a set clamping force, so as to enable stable connection.

7. The speaker rear cover of claim 1, wherein the connection assembly is made of a metal.

8. The speaker rear cover of claim 1, wherein the thickness of the rear cover body is 0.15 mm-0.2 mm.

9. The speaker rear cover of claim 1, wherein the rear cover body or the connection assembly is formed by stamping.

10. A speaker, comprising the rear cover of claim 1.
11. A speaker, comprising the rear cover of claim 2.
12. A speaker, comprising the rear cover of claim 3.
13. A speaker, comprising the rear cover of claim 4.
14. A speaker, comprising the rear cover of claim 5.
15. A speaker, comprising the rear cover of claim 6.
16. A speaker, comprising the rear cover of claim 7.
17. A speaker, comprising the rear cover of claim 8.
18. A speaker, comprising the rear cover of claim 9.

* * * * *